(12) United States Patent
Riedmann et al.

(10) Patent No.: US 12,397,845 B2
(45) Date of Patent: Aug. 26, 2025

(54) METHOD FOR OPERATING AN ADJUSTMENT DRIVE OF A MOTOR-ADJUSTABLE STEERING COLUMN, CONTROL UNIT, STEERING COLUMN AND MOTOR VEHICLE

(71) Applicants: thyssenkrupp Presta AG, Eschen (LI); thyssenkrupp AG, Essen (DE)

(72) Inventors: Patrick Riedmann, Dornbirn (AT); Andreas Willi, Lauterach (AT); Daniel Vitalis, Sax (CH); Gabor Major, Sevelen (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 18/916,362

(22) Filed: Oct. 15, 2024

(65) Prior Publication Data
US 2025/0128754 A1 Apr. 24, 2025

(30) Foreign Application Priority Data
Oct. 18, 2023 (BE) .................................. 2023/5865

(51) Int. Cl.
*B62D 1/181* (2006.01)
(52) U.S. Cl.
CPC .................................. *B62D 1/181* (2013.01)
(58) Field of Classification Search
CPC ..................................................... B62D 1/181
See application file for complete search history.

(56) References Cited

U.S. PATENT DOCUMENTS

| | | | | |
|---|---|---|---|---|
| 4,661,752 | A * | 4/1987 | Nishikawa | B62D 1/181 318/434 |
| 11,338,839 | B2 * | 5/2022 | Kurokawa | H02P 6/08 |
| 11,904,928 | B2 * | 2/2024 | Schwing | B62D 1/181 |
| 12,065,189 | B2 | 8/2024 | Vitalis et al. | |

(Continued)

FOREIGN PATENT DOCUMENTS

CN 114126952 A * 3/2022 ............. B62D 1/181
DE 10 2019 004 840 A1 1/2021

*Primary Examiner* — Drew J Brown
(74) *Attorney, Agent, or Firm* — thyssenkrupp North America, LLC

(57) ABSTRACT

The disclosure relates to a method for operating an adjustment drive of a motor-adjustable steering column for a motor vehicle, said steering column comprising an actuating unit with a rotatably mounted steering spindle, to which a steering wheel is attached, wherein the actuating unit is adjustable by at least one adjustment drive for setting a longitudinal position and/or height position of the steering wheel, wherein in the method: a) a setpoint value of an adjustment speed of the actuating unit is predefined; b) on the basis of the setpoint value, the at least one adjustment drive is driven with a voltage signal by way of at least one controller; c) an actual value of the adjustment speed of the actuating unit is detected after a predetermined time period and is compared with the setpoint value; and d) the setpoint value is reduced depending on the result of the comparison between setpoint value and actual value until the voltage signal for driving the adjustment drive lies below the maximum value of a supply voltage, in particular an onboard electrical system voltage of the motor vehicle.

8 Claims, 2 Drawing Sheets

(56) References Cited

U.S. PATENT DOCUMENTS

| | | | | |
|---|---|---|---|---|
| 2005/0050979 A1* | 3/2005 | Barcat | ............... | B62D 1/181 |
| | | | | 74/495 |
| 2007/0176405 A1* | 8/2007 | Barcat | ............... | B62D 1/181 |
| | | | | 280/775 |
| 2021/0291894 A1* | 9/2021 | Rouleau | ............... | H02P 6/24 |
| 2021/0354744 A1* | 11/2021 | Choi | ............... | B62D 5/046 |
| 2022/0274639 A1* | 9/2022 | Park | ............... | B62D 1/183 |
| 2022/0355849 A1* | 11/2022 | Schwing | ............ | B62D 1/181 |
| 2025/0026396 A1* | 1/2025 | Soderlind | ............ | B62D 1/181 |

* cited by examiner

METHOD FOR OPERATING AN ADJUSTMENT DRIVE OF A MOTOR-ADJUSTABLE STEERING COLUMN, CONTROL UNIT, STEERING COLUMN AND MOTOR VEHICLE

CROSS REFERENCE TO RELATED APPLICATION

This application is a U.S. Non-Provisional that claims priority to Belgian Patent Application No. BE 2023/5865, filed Oct. 18, 2023, the entire content of which is incorporated herein by reference.

FIELD

The present disclosure relates to a method for operating an adjustment drive of a motor-adjustable steering column, a control unit, a steering column and a motor vehicle.

BACKGROUND

Modern motor vehicles conventionally have adjustable steering columns which can be adjusted by motor in the longitudinal and/or height direction. A steering wheel position that is convenient for the driver can be set in this way. The adjustment movement of the steering wheel is realized using electric motors that move an actuating unit comprising a rotatably mounted steering spindle with a steering wheel relative to a carrying unit that carries the actuating unit. This is known from DE 10 2019 004 840 A1, for example.

During the adjustment of the actuating unit of the steering column, an adjustment speed at which the actuating unit and hence the steering wheel are intended to be moved is predefined. The predefined speed may result in a voltage signal for driving the motors which lies in a range above a supply voltage of the onboard electrical system of the motor vehicle. Influencing parameters for such a voltage signal may be for example temperature, friction, inaccurate mounting of the electric motors, etc.

This has the disadvantage that the electric motor cannot move the actuating unit at the desired adjustment speed. In this state, effective rotational speed control of the electric motor by means of a controller cannot take place since the onboard electrical system cannot provide the required operating voltage for the motor. The onboard electrical system and the controller are in a saturation state. By way of example, during the adjustment of the electric motor, the actuating unit may move at a certain speed that lies below the desired adjustment speed. What is disadvantageous here is the arising of noticeable speed fluctuations and audibly oscillating motor noise, which a vehicle occupant finds disturbing.

Thus a need exists for providing a method for operating an adjustment drive of a motor-adjustable steering column which results in improved acoustics and a uniform adjustment movement during the adjustment of the steering column. The disclosure is furthermore based on specifying a control unit for driving an adjustment drive, a steering column and a motor vehicle.

BRIEF DESCRIPTION OF THE FIGURES

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
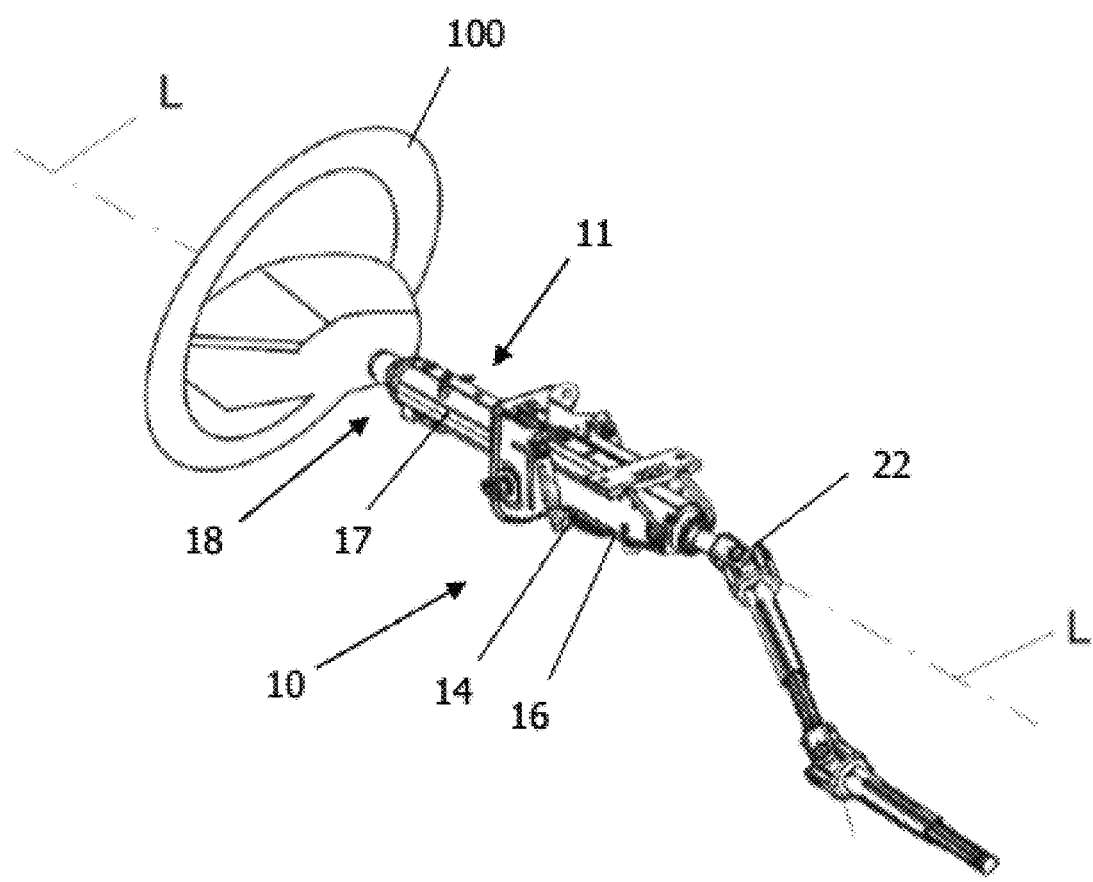
FIG. 1 shows a perspective view of a steering column according to one embodiment.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Some embodiments provide a method for operating an adjustment drive of a motor-adjustable steering column for a motor vehicle, said steering column comprising an actuating unit with a rotatably mounted steering spindle, to which a steering wheel is attached, wherein the actuating unit is adjustable by at least one adjustment drive for setting a longitudinal position and/or height position of the steering wheel, wherein in the method:

a) a setpoint value of an adjustment speed of the actuating unit is predefined;

b) on the basis of the setpoint value, the at least one adjustment drive is driven with a voltage signal by way of at least one controller;

c) an actual value of the adjustment speed of the actuating unit is detected after a predetermined time period and is compared with the setpoint value; and d) the setpoint value is reduced depending on the result of the comparison between setpoint value and actual value until the voltage signal for driving the adjustment drive lies below the maximum value of a supply voltage, in particular an onboard electrical system voltage of the motor vehicle.

An essential concept of the disclosure is to decrease the setpoint value of the predefined adjustment speed for adjusting the actuating unit if the actual value of the adjustment speed of the actuating unit after a predetermined time period does not correspond to the predefined setpoint value of the adjustment speed of the actuating unit. Detecting the actual value after the predetermined time period makes it possible first to wait for a start-up, in particular a start-up ramp, of the adjustment drive. A meaningful actual value of the adjustment movement of the actuating unit is thus detected.

If the actual value after the predetermined time period lies below the setpoint value of the adjustment speed, this is an indication that the supply voltage made available by the motor vehicle is too low to operate the adjustment drive so as to reach the setpoint adjustment speed set for the actuating unit. The setpoint adjustment speed may also be referred to as target adjustment speed. In this state, the overall system and hence the controller are in a saturated state in which the controller cannot carry out control of the adjustment speed of the actuating unit. In the saturated state, the adjustment movement of the actuating unit is subject to noticeable speed fluctuations. Furthermore, audibly oscillating adjustment noise arises, which a vehicle occupant finds disturbing.

The disclosure counteracts this effect by reducing the setpoint value of the adjustment speed until the voltage signal for driving the adjustment drive lies below the maximum value of the supply voltage made available in the motor vehicle. A supply voltage of 12 volts is provided as standard in motor vehicles. Other voltage values for the supply voltage are possible.

Reducing the setpoint value creates for the controller a control reserve, in particular a buffer, which enables the controller to compensate for speed fluctuations and thus to smooth oscillating adjustment noise. In other words, the method according to the disclosure has the advantage that the adjustment movement of the actuating unit takes place at a uniform speed and with uniform, in particular slight, adjustment noise. This has a positive effect on the acoustics of the adjustment process as such, whereby a feeling of high-grade processing and hence high quality is conveyed to the vehicle occupant.

Not reaching the setpoint adjustment speed of the actuating unit, or the saturation state of the system, may depend on a large number of internal and external influencing factors. By way of example, the internal friction that occurs during the adjustment of the steering column may be increased at low ambient temperature. The actuating unit is thereby hampered in terms of movability, such that the adjustment drive would need to be driven with an increased voltage signal in order to reach the predefined setpoint value of the adjustment speed. The performance of the adjustment drive may decrease at excessively high ambient temperature. Further influencing factors may be an excessively low supply voltage, for example as a result of an onboard electrical supply system, inaccurate mounting of the adjustment drive on the steering column and/or an excessively high tightening torque of the fastening means of the adjustment drive. Further influencing factors are possible.

The controller which drives the adjustment drive with the voltage signal is preferably a rotational speed controller. The controller is preferably integrated in an ECU (electronic control unit). The adjustment drive is preferably an electric drive, in particular an electric motor.

The actual value of the adjustment speed of the actuating unit can be detected in various ways. The adjustment speed can either be detected directly by means of a measurement of the adjustment speed. At least one sensor can be provided for this purpose. Additionally or alternatively, the adjustment speed can be detected indirectly by the adjustment speed being calculated from ascertained values other than the measured adjustment speed or the adjustment speed being deduced on the basis thereof. By way of example, the adjustment speed can be ascertained from the rotational speed of the adjustment drive, in particular of the electric motor, on the basis of a known transmission ratio, e.g. of a spindle drive.

The setpoint value and the actual value of the adjustment speed are preferably detected or specified in millimetres of an adjustment travel per second (mm/s).

The actual value of the adjustment speed is detected after the predetermined time period, i.e. at a determined point in time. The actual value is thus a snapshot at the determined point in time. This does not preclude the actual adjustment speed from being able to vary in a determined value range. In other words, the actual adjustment speed can vary in the form of an oscillation during the time period. In this case, the actual speed can vary between an upper limit and a lower limit. A fully rectilinear profile (ideal profile) of the actual speed is possible. The actual adjustment speed preferably follows an oscillation-like profile which is dependent e.g. on the rotational speed of the adjustment drive. Additional causes of the oscillation-like profile may be a spindle drive coupled to the adjustment drive. Other influencing factors are possible.

In one preferred embodiment, the setpoint value is reduced after the predetermined time period if the actual value lies below the setpoint value. In other words, if such a result from the comparison between the setpoint value and the actual value of the adjustment speed is first present, the setpoint value, i.e. the target adjustment speed, is reduced in order to cancel the saturation state of the controller and to reduce the fluctuations of the adjustment speed and the disturbing adjustment noise. If the actual value substantially corresponds to the setpoint value of the adjustment speed, reduction preferably takes place only if the controller is still in the saturation state. This may be the case if the control reserve is too small, i.e. the voltage signal required for driving the adjustment drive is (still) too high.

Preferably, the setpoint value is therefore reduced until the voltage signal of the controller is between 60 percent and 95 percent of the maximum value of the supply voltage. As a result, the controller leaves the state of saturation and can carry out the compensation of speed fluctuations.

In a further preferred embodiment, the setpoint value is reduced after the predetermined time period step by step in at least one predetermined time interval. Particularly preferably, the setpoint value of the adjustment speed is reduced in multiple, in particular small, steps. By way of example, the setpoint value is reduced by the absolute value of 1 mm/s. It is advantageous here that the setpoint value is brought closer in steps to the saturation limit of the controller and hence the maximum operating voltage of the adjustment drive at which a compensation of the speed fluctuations by the controller is possible.

It is advantageous if the amplitude level of the fluctuation, in particular oscillation, of the actual adjustment speed is detected and the setpoint value is reduced in a manner dependent thereon. This prevents the setpoint value from being decreased to an unnecessarily great extent. Preferably, a lower limit for the setpoint value is defined, down to which the setpoint value can be reduced.

In one preferred embodiment, the voltage signal of the controller is measured and the measured voltage signal is compared with the maximum value of the supply voltage in order to detect a saturation state of the controller. As a result, a saturation limit of the controller is advantageously ascertained which makes it possible to correspondingly adapt the setpoint value on the basis of this limit. As a result, the setpoint value adaptation is optimized.

Preferably, the adjustment drive is driven by the controller by means of pulse width modulation. In other words, the adjustment drive is preferably driven by a pulse width modulation signal. This makes use of the advantageous effect that, in the case of pulse width modulation, the input voltage of the adjustment drive, in particular electric motor, is continuously switched on and off at a specific, in particular high, frequency. This has the advantage that the combination of coil inductance and drive inertia results in the smoothing of the motor rotational speed. The speed fluctuations during the adjustment and also the oscillating adjustment noise are thus considerably reduced by the pulse width modulation.

According to one coordinate aspect, the disclosure relates to a control unit for operating an adjustment drive of a motor-adjustable steering column for a motor vehicle, said steering column comprising an actuating unit with a rotatably mounted steering spindle, to which a steering wheel is attached, wherein the actuating unit is adjustable by at least one adjustment drive for setting a longitudinal position and/or height position of the steering wheel, wherein the control unit is adapted:

a) to predefine a setpoint value of an adjustment speed of the actuating unit;
　b) on the basis of the setpoint value, to drive the at least one adjustment drive with a voltage signal by way of at least one controller;
　c) to detect an actual value of the adjustment speed of the actuating unit after a predetermined time period and to compare it with the setpoint value; and
　d) to reduce the setpoint value on the basis of a result of the comparison between setpoint value and actual value until the voltage signal for driving the adjustment drive lies below the maximum value of a supply voltage, in particular an onboard electrical system voltage of the motor vehicle.

The advantages mentioned in connection with the method also apply, mutatis mutandis, to the control unit according to the disclosure. The method steps described in connection with the method are also disclosed in connection with the control unit, specifically in the form that the control unit is in particular configured or adapted to carry out these method steps. Generally, therefore, the control unit is advantageously suitable for executing the method according to the disclosure. More particularly, the control unit is designed to control the execution of the method according to the disclosure, and in particular the sequence of the method according to the disclosure.

According to a further coordinate aspect, the disclosure relates to a motor-adjustable steering column for a motor vehicle, said steering column comprising an actuating unit with a rotatably mounted steering spindle, to which a steering wheel is attached, and at least one control unit according to the disclosure, wherein the actuating unit is adjustable by at least one adjustment drive for setting a longitudinal position and/or height position of the steering wheel and the adjustment drive is drivable by the control unit.

According to a further coordinate aspect, the disclosure relates to a motor vehicle comprising at least one control unit according to the disclosure and/or at least one motor-adjustable steering column, as described above.

With regard to the advantages of the steering column and the motor vehicle, reference is made to the advantages explained in connection with the method. Furthermore, the steering column and the motor vehicle can alternatively or additionally have individual features or a combination of a plurality of features from among those mentioned above in relation to the method.

The disclosure is explained more specifically below with further details with reference to the accompanying drawings. The illustrated embodiment constitutes one example of how the control unit and steering column according to the disclosure can be configured.

In the following description, the same reference numerals are used for identical or identically acting parts.

FIG. 1 shows a motor-adjustable steering column 10 for a motor vehicle according to one preferred exemplary embodiment according to the disclosure. The steering column 10 comprises a carrying unit 14, which is embodied as a support bracket having fastening holes 15 for attachment to a vehicle bodywork (not illustrated). The carrying unit 14 carries an actuating unit 11 held with interposition of a casing unit 16 and arranged telescopically in the casing unit 16. The actuating unit 11 comprises a casing tube 17 and a steering spindle 12 mounted in the casing tube 17 rotatably about a longitudinal axis L. A fastening section 19 is formed at a first end 18 of the steering spindle 12 (see FIG. 2), a steering wheel 100 being attached to said fastening section. At a second end 21, the steering spindle 12 is torque-lockingly connected to a yoke of a universal joint 22. This is readily discernible in FIG. 1.

Figure 2:
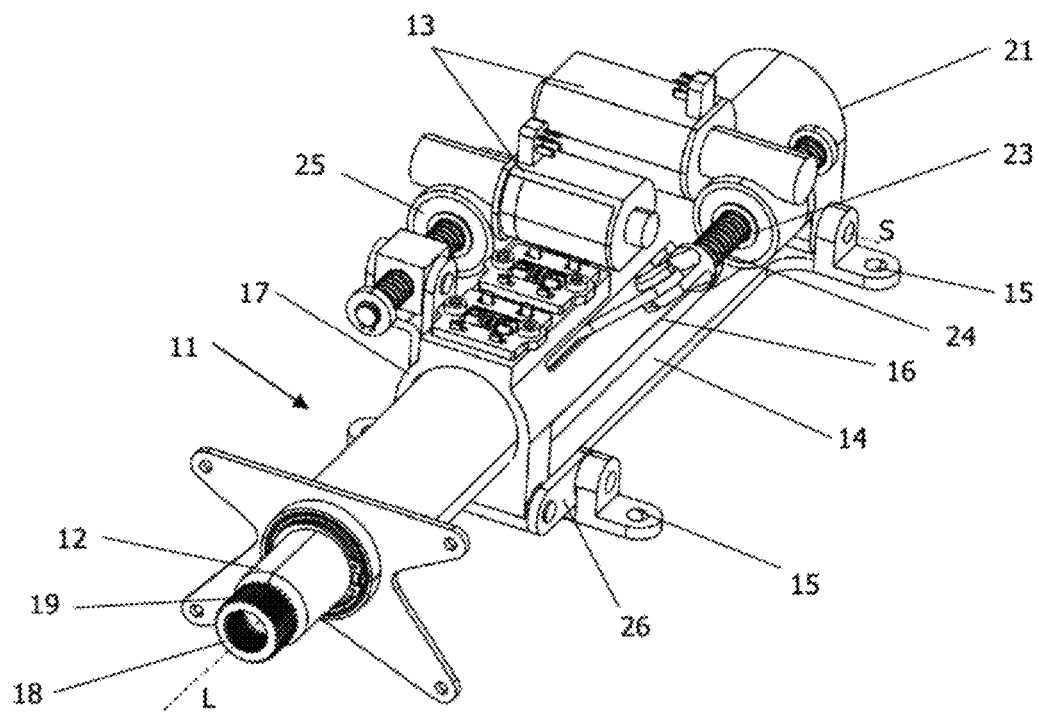
FIG. 2 shows a further perspective view of the steering column in accordance with FIG. 1.

FIG. 2 illustrates in specific detail the steering column 10 in isolation, in order to allow better elucidation. The actuating unit 11 of the steering column 10 is longitudinally adjustable and height-adjustable relative to the carrying unit 14 by means of two adjustment drives 13. For this purpose, the adjustment drive 13 for the longitudinal adjustment is coupled to a spindle nut 23 via a gear mechanism. The spindle nut 23 is in engagement with a threaded spindle 24, which is coupled to the casing tube 17 and displaces the latter upon the driving of the spindle nut 23 in the longitudinal direction L.

The adjustment drive 13 for the height adjustment actuates, via a second threaded drive 25, a rotatable actuating lever 26 connecting the casing unit 16 to the carrying unit 14. Upon actuation of the actuating lever 26, the actuating unit 11 is pivoted relative to the carrying unit 14 about a horizontal pivot axis S, defined by a pivot bearing 22, and is thereby adjusted in terms of height. The use of a lever system for force transmission means that the resulting adjustment speed of the actuating unit 11, with a constant drive speed of the adjustment drive 13, is dependent on the respective position of the actuating unit 11.

The two adjustment drives 13 are electric motors that are driven by a control unit (not illustrated), in particular the ECU. The control unit comprises at least one controller adapted to control the rotational speed of the electric motors 13. It is possible to provide one controller per electric motor 13, or for both electric motors 13 to be drivable by the same controller.

Figure 3:
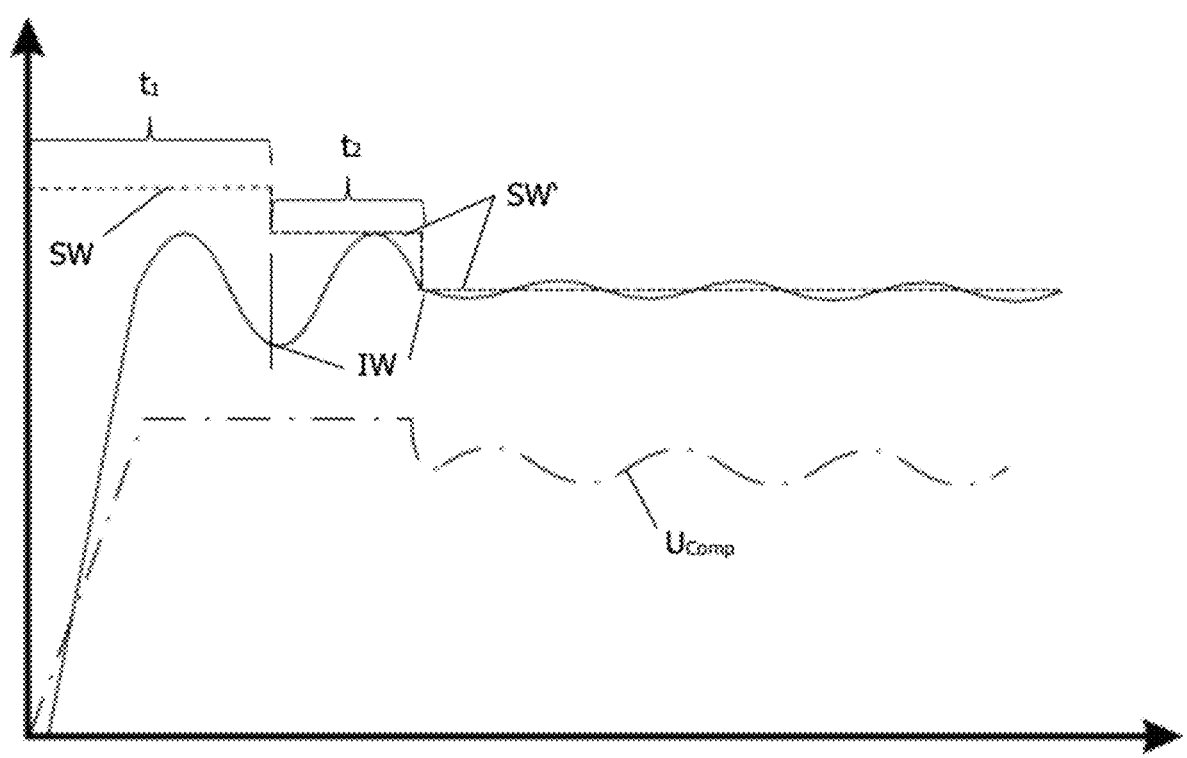
FIG. 3 shows a diagram to illustrate the speed profile of an adjustment drive for setting a longitudinal position and/or height position of the steering wheel as part of the steering column in accordance with FIG. 1.

In order to produce an adjustment movement that is as uniform as possible and also homogeneous motor noise during an adjustment of the steering wheel position, the electric motors 13 are operated according to the following method according to the disclosure. In this respect, FIG. 3 shows a speed profile of the adjustment speed of the actuating unit and also a voltage profile dependent thereon in a diagram. The ordinate corresponds to an adjustment speed in millimetres of the adjustment travel per second (mm/s) at which the actuating unit is moved. The abscissa corresponds to time in seconds, with the scales being left out.

It is pointed out at this juncture that the control unit is adapted to execute the method steps described below.

In a first method step a) the control unit defines a setpoint value SW of an adjustment speed of the actuating unit 11. The setpoint value SW is e.g. 12 mm/s. The setpoint value SW is that speed value at which the actuating unit 11 and hence the steering wheel 100 are intended to be moved in the adjustment direction for the purpose of longitudinal or height adjustment. This setpoint value corresponds to the target adjustment speed of the actuating unit 11 and hence of the steering wheel 100.

On the basis of this predefined setpoint value SW, in a second method step b) the control unit ascertains a voltage signal used to drive the electric motor 13. Specifically, this is a PWM signal, i.e. a pulse width modulation signal.

In a third method step c) an actual value IW of the adjustment speed is detected after a first, predetermined time period $t_1$. The first time period $t_1$ can be 200 milliseconds, for example. The actual value IW can be detected in various ways. The actual value IW can either be detected directly by means of a measurement of the adjustment speed by sensor. Additionally or alternatively, the actual value IW can be detected indirectly by the actual value IW being calculated from other ascertained values or the actual value IW being deduced on the basis thereof. By way of example, the actual value IW of the adjustment speed can be ascertained from the rotational speed of the electric motor 13 on the basis of a known transmission ratio e.g. of a spindle drive 23, 24, 25.

The actual value IW of the adjustment speed is detected after the predetermined time period, i.e, thus at a determined point in time. The actual value IW is thus a snapshot at the determined point in time. This does not preclude the actual adjustment speed from varying in a determined value range (see FIG. 3). In other words, the actual adjustment speed can vary in the form of an oscillation during the time period. In this case, the actual speed can vary between an upper limit and a lower limit.

After the actual value IW of the adjustment speed has been determined, the control unit carries out a comparison of the predefined setpoint value SW and the determined actual value IW. Afterwards, in a fourth method step d) the setpoint value SW is altered depending on the result of the comparison. If the actual value IW after the predetermined time period $t_1$ lies below the predefined setpoint value SW of the adjustment speed, the setpoint value SW is reduced by a first absolute value B1. The setpoint value SW can be reduced e.g. by the absolute value B1 of 1 millimetre per second. The predefined setpoint value SW thus becomes the reduced setpoint value SW'.

Afterwards, the output voltage is measured at the controller in order to ascertain whether the controller is in a saturated state. The controller or the overall system of the motor vehicle is in a saturated state if the required voltage signal does not suffice for driving the electric motor 13 or corresponds to a high percentage proportion of the supply voltage of the onboard electrical system. In this state, the controller cannot effect rotational speed control at the electric motor 13. This may be the case e.g. if the output voltage of the controller is greater than 95 percent of the maximum supply voltage. The controller is then saturated and cannot effect compensation of rotational speed fluctuations by means of pulse width modulation.

Afterwards, after a second, predetermined time period $t_2$, a further actual value determination of the adjustment speed is effected in order to detect whether the actual speed of the actuating unit 11 now substantially corresponds to the setpoint value SW' reduced by the first absolute value B1. If not, the setpoint value SW' is reduced by a second absolute value B2. This step-by-step reduction of the setpoint value SW, SW' takes place until the voltage signal for driving the electric motor 13 is reduced to a determined voltage value $U_{Comp}$ below the maximum value of the supply voltage or the onboard electrical system voltage of the motor vehicle. The determined voltage value $U_{Comp}$ can be e.g. up to 95 percent of the maximum supply voltage. The controller then leaves the saturated state. In this case, by means of the reduced voltage signal, a control reservoir is created by means of which, with the PWM signal, rotational speed fluctuations are minimized and uniform, preferably slight, motor noise is generated during the adjustment movement of the actuating unit 11.

It is pointed out that the setpoint value SW is not reduced endlessly upon the target speed not being reached. In order to prevent this, a lower limit for the setpoint value SW down to which a reduction takes place is defined. The lower limit can be 8 mm/s, for example. All abovementioned values of the setpoint value SW, of the first and second absolute values B1, B2 and of the lower limit merely constitute examples. Other values are possible. Furthermore, it is pointed out that the method steps described above can be executed in a different order from the one mentioned.

LIST OF REFERENCE SIGNS

10 Steering column
11 Actuating unit
12 Steering spindle
13 Adjustment drive
14 Carrying unit
15 Fastening holes
16 Casing unit
17 Casing tube
18 First end
19 Fastening section
21 Second end
22 Universal joint
23 Spindle nut
24 Threaded spindle
25 Threaded drive
26 Actuating lever
100 Steering wheel
B1 First absolute value
B2 Second absolute value
SW Setpoint value
SW' Reduced setpoint value
IW Actual value
$t_1$ Predetermined time period
$t_2$ Predetermined time interval
L Longitudinal direction
S Pivot axis
$U_{Comp}$ Reduced voltage signal

What is claimed is:

1. A method for operating an adjustment drive of a motor-adjustable steering column for a motor vehicle, said steering column comprising an actuating unit with a rotatably mounted steering spindle, to which a steering wheel is attached, wherein the actuating unit is adjustable by at least one adjustment drive for setting a longitudinal position and/or height position of the steering wheel, the method comprising:
   predefining a setpoint value of an adjustment speed of the actuating unit;
   on the basis of the setpoint value, driving the at least one adjustment drive with a voltage signal by way of at least one controller;
   detecting an actual value of the adjustment speed of the actuating unit after a predetermined time period and comparing the actual value with the setpoint value; and
   reducing the setpoint value depending on the result of the comparison between setpoint value and actual value until the voltage signal for driving the adjustment drive lies below a maximum value of a supply voltage.

2. The method according to claim 1, wherein the setpoint value is reduced after the predetermined time period if the actual value lies below the setpoint value.

3. The method according to claim 1, wherein the setpoint value is reduced until the voltage signal of the controller is between 60 percent and 95 percent of the maximum value of the supply voltage.

4. The method according to claim 1, wherein the setpoint value is reduced after the predetermined time period step by step in at least one predetermined time interval.

5. The method according to claim 1, wherein the voltage signal of the controller is measured and the measured voltage signal is compared with the maximum value of the supply voltage in order to detect a saturation state of the controller.

6. The method according to claim 1, wherein the adjustment drive is driven by the controller by pulse width modulation.

7. A control unit for operating an adjustment drive of a motor-adjustable steering column for a motor vehicle, said steering column comprising an actuating unit with a rotatably mounted steering spindle, to which a steering wheel is attached, wherein the actuating unit is adjustable by at least one adjustment drive for setting a longitudinal position and/or height position of the steering wheel, wherein the control unit is configured:

to predefine a setpoint value of an adjustment speed of the actuating unit;

on the basis of the setpoint value, to drive the at least one adjustment drive with a voltage signal by way of at least one controller;

to detect an actual value of the adjustment speed of the actuating unit after a predetermined time period and to compare it with the setpoint value; and to reduce the setpoint value on the basis of a result of the comparison between setpoint value and actual value until the voltage signal for driving the adjustment drive lies below a maximum value of a supply voltage.

8. A motor-adjustable steering column for a motor vehicle, said steering column comprising an actuating unit with a rotatably mounted steering spindle, to which a steering wheel is attached, and at least one control unit according to claim 7, wherein the actuating unit is adjustable by at least one adjustment drive for setting a longitudinal position and/or height position of the steering wheel and the adjustment drive is drivable by the control unit.

* * * * *